US012688982B2

(12) United States Patent
Aoki et al.

(10) Patent No.: US 12,688,982 B2
(45) Date of Patent: Jul. 21, 2026

(54) HANDLE LOCK DEVICE OF CIRCUIT BREAKER

(71) Applicant: FUJI ELECTRIC FA COMPONENTS & SYSTEMS CO., LTD., Konosu (JP)

(72) Inventors: Tadahisa Aoki, Konosu-city (JP); Hiroshi Moriai, Ohtawara-city (JP); Hiroto Yamada, Konosu-city (JP)

(73) Assignee: FUJI ELECTRIC FA COMPONENTS & SYSTEMS CO., LTD., Konosu (JP)

( * ) Notice: Subject to any disclaimer, the term of this patent is extended or adjusted under 35 U.S.C. 154(b) by 239 days.

(21) Appl. No.: 18/491,975

(22) Filed: Oct. 23, 2023

(65) Prior Publication Data

US 2024/0212949 A1 Jun. 27, 2024

(30) Foreign Application Priority Data

Dec. 23, 2022 (JP) ................................ 2022-207202

(51) Int. Cl.
*H01H 9/20* (2006.01)
*H01H 9/28* (2006.01)
*H01H 23/12* (2006.01)

(52) U.S. Cl.
CPC ................ *H01H 9/20* (2013.01); *H01H 9/28* (2013.01); *H01H 23/12* (2013.01)

(58) Field of Classification Search
CPC ....................................................... H01H 9/28
USPC ..................... 200/43.14, 43.15, 43.19, 43.22
See application file for complete search history.

(56) References Cited

U.S. PATENT DOCUMENTS

| | | | | |
|---|---|---|---|---|
| 4,733,029 A * | 3/1988 | Kobayashi | H01H 9/283 | 200/43.15 |
| 4,978,816 A * | 12/1990 | Castonguay | H01H 9/282 | 200/43.14 |
| 5,349,145 A * | 9/1994 | Kelaita, Jr. | H01H 9/281 | 200/43.15 |
| 5,909,019 A * | 6/1999 | Maloney | H01H 9/282 | 200/43.14 |
| 10,102,988 B2 * | 10/2018 | Khojare | H01H 21/06 | |

FOREIGN PATENT DOCUMENTS

JP 2015-43264 A 3/2015

* cited by examiner

*Primary Examiner* — Renee S Luebke

(57) ABSTRACT

A circuit breaker has at least two handle lock screw engagement portions to which a handle lock device is attached formed on a case at positions different from a position of an attachment screw for integrating a case including a plurality of divided bodies. The handle lock device has at least two attaching screws disposed, the attaching screws engaging with the handle lock screw engagement portions of the circuit breaker and attaching the handle lock device at a regular position on the circuit breaker. The handle lock device has a handle locking portion disposed, the handle locking portion restricting the knob portion from moving to an ON position even when the attaching screws are incorrectly attached to the handle lock screw engagement portions.

2 Claims, 8 Drawing Sheets

HANDLE LOCK DEVICE OF CIRCUIT BREAKER

CROSS REFERENCE TO RELATED APPLICATIONS AND INCORPORATION BY REFERENCE

This application claims benefit of priority under 35 USC 119 based on Japanese Patent Application No. 2022-207202 filed on Dec. 23, 2022, the entire contents of which are incorporated by reference herein.

TECHNICAL FIELD

The present disclosure relates to a handle lock device of a circuit breaker that is applied to a breaker for wiring, an earth leakage breaker, or the like as an external attachment device thereof.

BACKGROUND ART

In order to prevent an open-close operation handle of a circuit breaker that is mounted in a switchboard from being mistakenly switched from an OFF position (a position at which main circuit contacts are brought into an open state) to an ON position (a position at which the main circuit contacts are brought into a closed state), request and a demand for a handle lock device that locks a knob portion of a rocker-type open-close operation handle to the OFF position have increased.

As a conventional handle lock device, a device in which when the device is locked with a padlock, a lock member locks a knob portion of an open-close operation handle to an OFF position has been known (for example, JP 2015-43264 A).

SUMMARY OF INVENTION

Technical Problem

A conventional handle lock device is attached, by an attachment screw that connects a box-shaped base and cover constituting a circuit breaker to each other, on an upper portion of the cover.

Therefore, when a handle lock device is newly attached to a circuit breaker that is mounted in a switchboard, it is required to remove the circuit breaker from the switchboard, remove an attachment screw, and subsequently fasten together the handle lock device, a base, and a cover by the attachment screw again. As described above, when a conventional handle lock device is attached to a circuit breaker, a lot of efforts, such as removing the circuit breaker from a switchboard and removing an attachment screw from the circuit breaker, are required.

In addition, since, in the conventional handle lock device, the padlock can be locked even when the handle lock device is attached to the cover of the circuit breaker in an incorrect direction and the lock member does not restrain the knob portion from moving from the OFF position, there has been a risk that the handle lock device is used while the handle lock device is incorrectly attached.

Accordingly, an object of the present disclosure is to provide a handle lock device of a circuit breaker that can be easily attached without removing an attachment screw of the circuit breaker and can also lock a knob portion of a handle to an OFF position even when the handle lock device is incorrectly attached to the circuit breaker.

Solution to Problem

In order to achieve the above-described object, according to an aspect of the present disclosure, there is provided a handle lock device of a circuit breaker, the handle lock device locking a knob portion of a rocker-type open-close operation handle projecting from an upper portion of a case of the circuit breaker to an OFF position, wherein the circuit breaker has, at positions different from a position of an attachment screw for integrating the case including a plurality of divided bodies, at least two handle lock screw engagement portions to which the handle lock device is attached formed on the case, the handle lock device has at least two attaching screws disposed, the attaching screws engaging with the handle lock screw engagement portions of the circuit breaker and attaching the handle lock device at a regular position on the circuit breaker, and also has a handle locking portion disposed, the handle locking portion restricting the knob portion from moving to an ON position even when the attaching screws are incorrectly attached to the handle lock screw engagement portions.

Advantageous Effects of Invention

According to the handle lock device of a circuit breaker of the present disclosure, the handle lock device can be easily attached without removing an attachment screw of the circuit breaker and can also lock a knob portion of a handle to an OFF position even when the handle lock device is incorrectly attached to the circuit breaker.

DESCRIPTION OF EMBODIMENTS

Embodiments of the present disclosure will now be described with reference to the attached drawings. Throughout the drawings, identical or similar members are labeled with the same or similar signs. It should be noted, however, that the drawings are schematic, and the relationship between a thickness and a planar dimension, the ratio in thickness between layers, and the like are different from real ones. Thus, concrete thicknesses and dimensions should be judged in consideration of descriptions below. Needless to say, the drawings include members with mutually different relations or ratios of dimensions.

In addition, embodiments described below illustrate, by way of example, a device or a method for embodying technical concepts of the present invention, and the technical concepts of the present invention do not specifically limit the material, shape, structure, arrangement, and the like of a component to those described below. Various changes may be made to the technical concepts of the present invention within the technical scope defined by the claims set forth in the appended claims.

Figure 1:
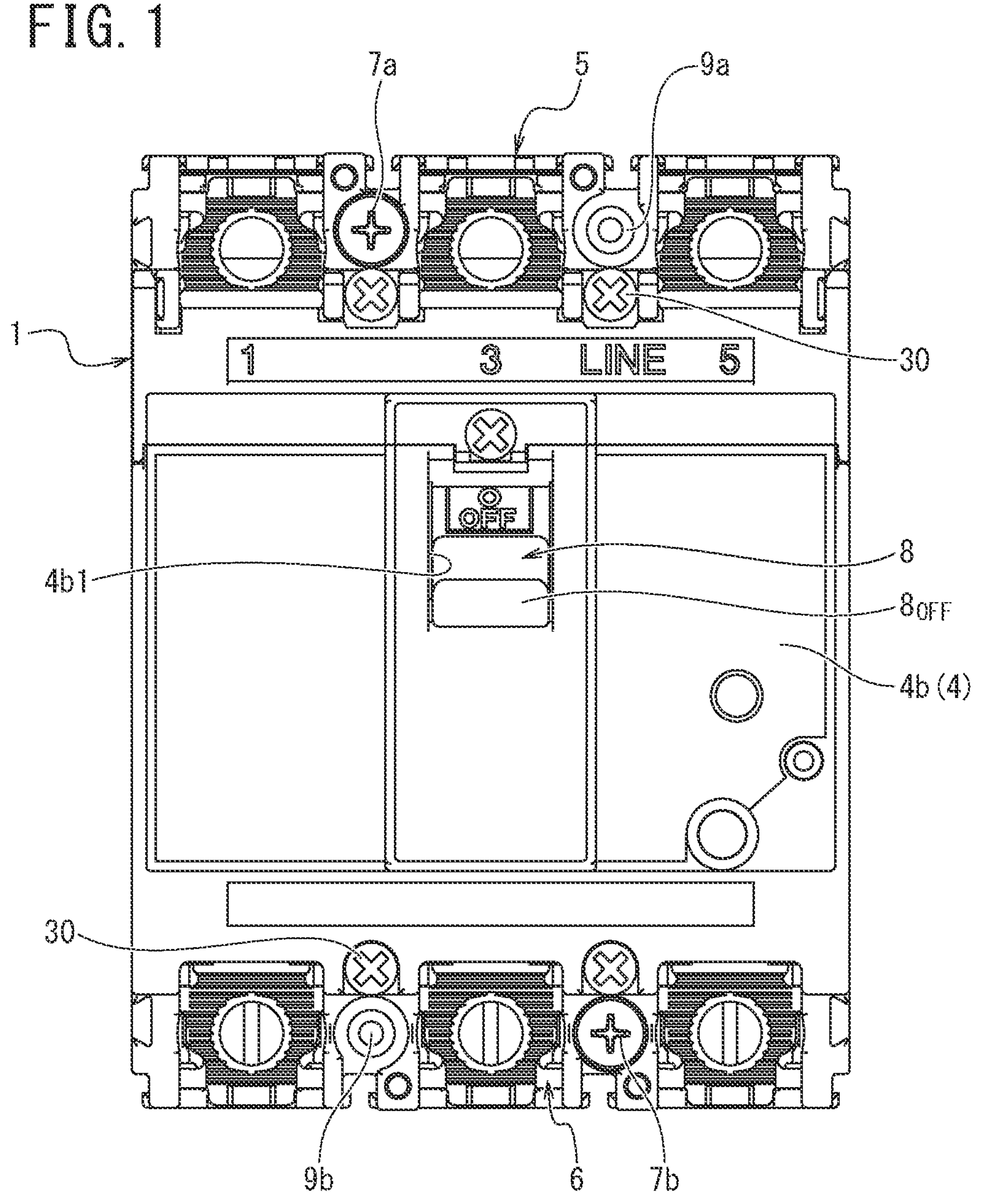
FIG. 1 is a plan view illustrative of a circuit breaker according to the present disclosure.
Figure 2:
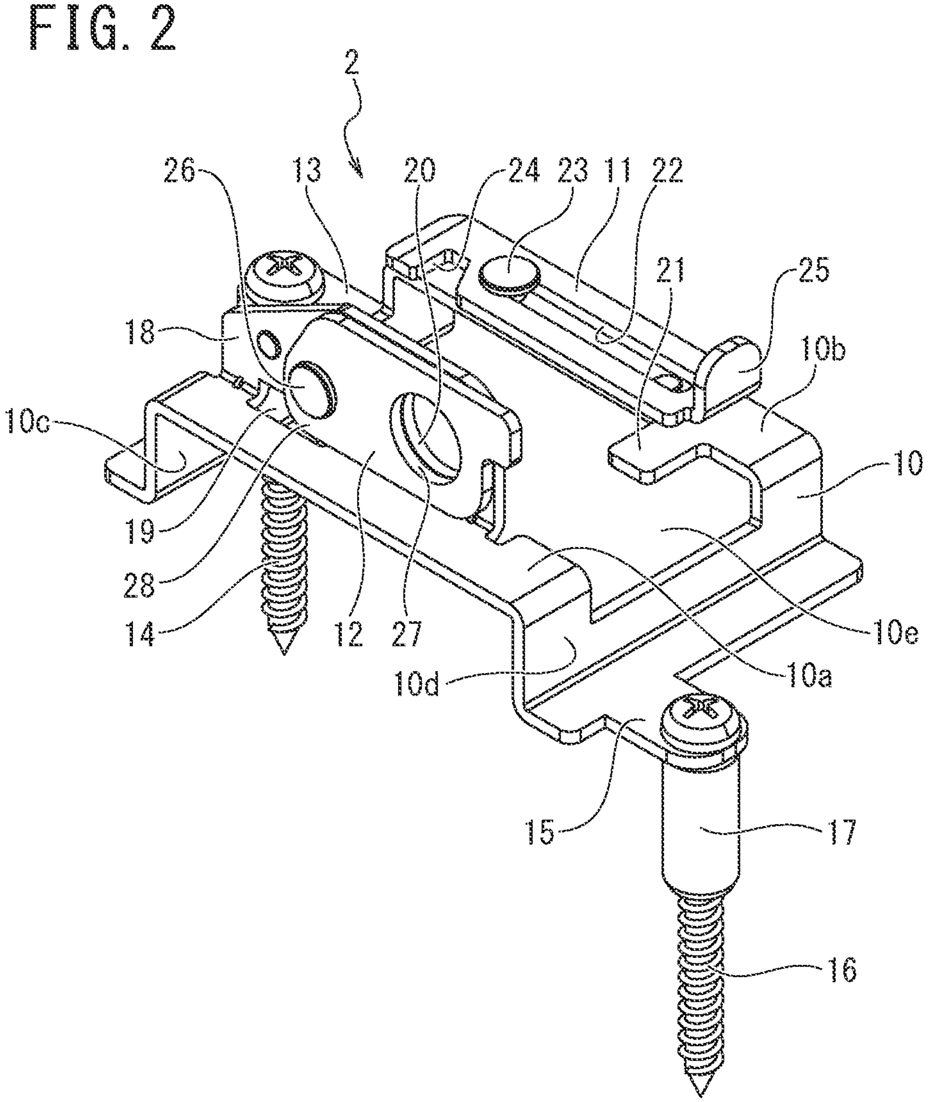
FIG. 2 is a perspective view illustrative of a handle lock device according to the present disclosure.
Figure 3:
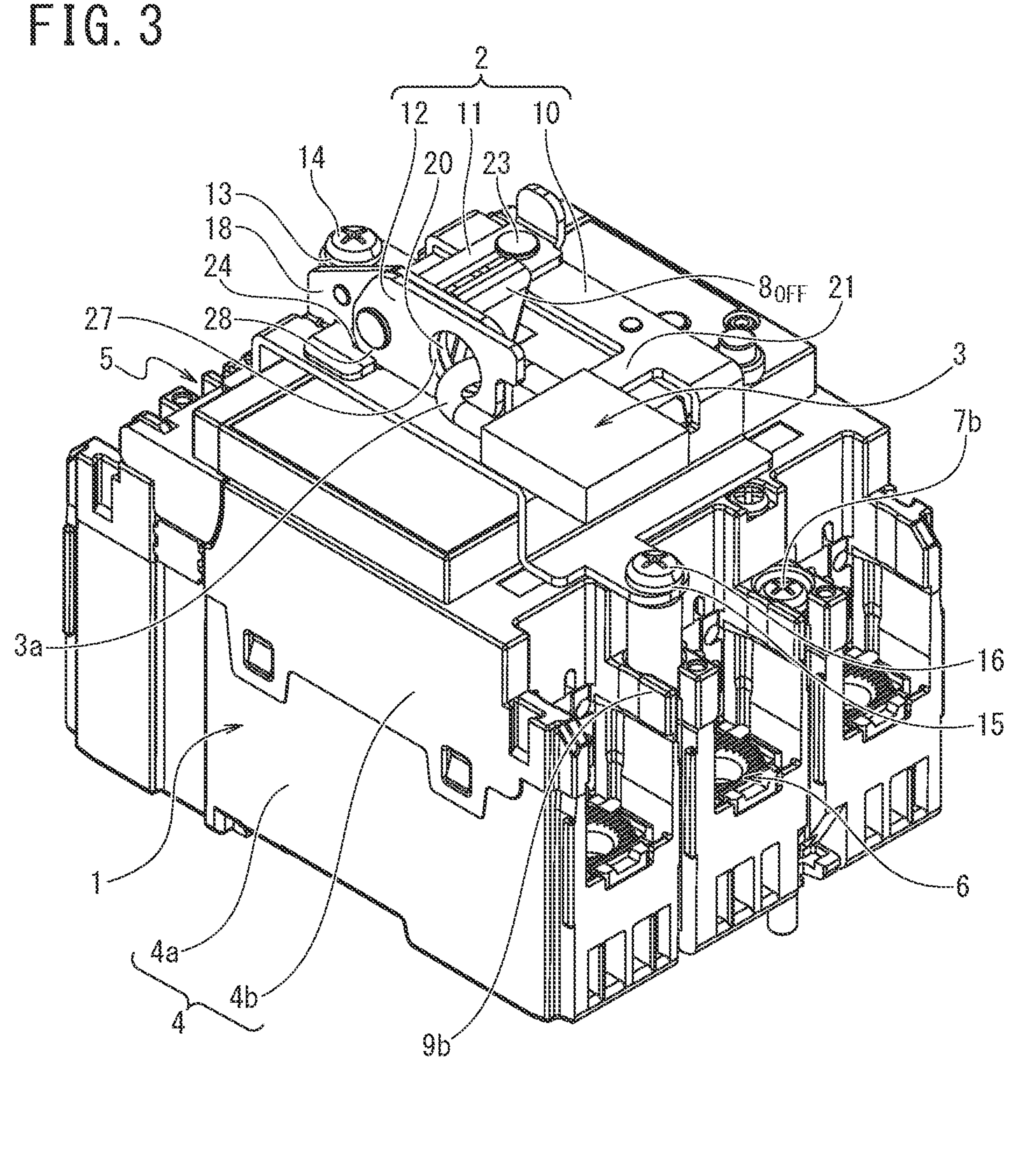
FIG. 3 is a perspective view illustrative of a state in which the handle lock device according to the present disclosure is attached at a regular position on the circuit breaker and, by being locked with a padlock, a knob portion is locked to an OFF position.

FIG. 1 is a plan view illustrative of a circuit breaker 1 of one embodiment, FIG. 2 is a perspective view illustrative of a handle lock device 2 of the one embodiment, and FIG. 3 is a perspective view illustrative of a state in which the handle lock device 2 is attached to the circuit breaker 1 and a padlock 3 is attached to the handle lock device 2.

As illustrated in FIGS. 1 and 3, the circuit breaker 1 includes a main-body case 4 that includes a box-shaped base 4*a* and a box-shaped cover 4*b* and has a three-pole power supply-side terminal portion 5 and a three-pole load-side terminal portion 6 formed on both side portions of the main-body case 4. By attachment screws designated by a reference numeral 30, the base 4*a* and the cover 4*b* are integrated with each other. Fixing screws 7*a* and 7*b* that penetrate partition walls disposed between poles of the power supply-side terminal portion 5 and between poles of the load-side terminal portion 6, respectively, fix the circuit breaker 1 on the inside of a switchboard. In addition, an opening portion 4*b*1 is formed in the cover 4*b* of the main-body case 4, and a knob portion $\mathbf{8}_{OFF}$ of a rocker-type handle 8 for operating a toggle link mechanism (open-close mechanism) arranged inside the main-body case 4 projects upward out of the opening portion 4*b*1. As used herein, the reference numeral $\mathbf{8}_{OFF}$ denotes a position to which the knob portion moved in such a way that main circuit contacts of the circuit breaker 1 are opened (an OFF position of the handle 8). Note that when the knob portion moves upward in FIG. 1, the main circuit contacts are closed (an ON position of the handle 8).

In FIG. 1, on a portion of the cover 4*b* located on the right side of the fixing screw 7*a*, a power supply-side engagement portion 9*a* with which a power supply-side attaching screw 14, which will be described later, of the handle lock device 2 engages is formed, and on a portion of the cover 4*b* located on the left side of the fixing screw 7*b*, a load-side engagement portion 9*b* with which a load-side attaching screw 16 of the handle lock device 2 engages is formed. Each of the power supply-side engagement portion 9*a* and the load-side engagement portion 9*b* is formed in a blind hole in which a female screw formed inside is closed by a lid made of resin.

As illustrated in FIG. 2, the handle lock device 2 includes a lock base 10, a handle lock plate 11, and a lock plate holding member 12, each of which is formed of a metal plate material.

The lock base 10 includes a pair of first frames 10*a* and 10*b* that extend in parallel with each other and a pair of second frames 10*c* and 10*d* that are bent from both ends of the pair of first frames 10*a* and 10*b* in the same direction and connect the first frames 10*a* and 10*b* to each other, and has an opening portion 10*e* formed, the opening portion 10*e* being surrounded by the pair of first frames 10*a* and 10*b* and the pair of second frames 10*c* and 10*d*. On the one second frame 10*c* side, a power supply-side connection portion 13 in which a through-hole is formed, the power supply-side attaching screw 14 that has a head thereof engaging with the power supply-side connection portion 13 and is inserted into the through-hole, and a spacer (not illustrated) that continues from a lower portion of the power supply-side connection portion 13 and into which an upper portion of a screw portion of the power supply-side attaching screw 14 is inserted are disposed. In addition, on the other second frame 10*d* side, a load-side connection portion 15 in which a through-hole is formed, the load-side attaching screw 16 that has a head thereof engaging with the load-side connection portion 15 and is inserted into the through-hole, and a spacer 17 that continues from a lower portion of the load-side connection portion 15 and into which an upper portion of a screw portion of the load-side attaching screw 16 is inserted are disposed.

On one first frame 10*a* of the lock base 10, a support plate 18 rises from an edge portion on the opening portion 10*e* side. On a lower portion on the power supply-side connection portion 13 side of the support plate 18, a slit 19 into which one end side of the handle lock plate 11 can be inserted is formed. In addition, in an end portion on the load-side connection portion 15 side of the support plate 18, a support plate locking hole 20 through which a shackle 3*a* of the padlock 3 passes is formed. In addition, on the other first frame 10*b* of the lock base 10, a handle locking protrusion 21 that protrudes toward the opening portion 10*e* is formed.

The handle lock plate 11 is a long-length member having substantially the same width as the other first frame 10*b* and has a slide long hole 22 formed, the slide long hole 22 penetrating the handle lock plate 11 in the plate thickness direction and extending in the longitudinal direction of the handle lock plate 11. In addition, at a position close to the power supply-side connection portion 13 on the other first frame 10*b*, a first rotation shaft 23 is fixed. The first rotation shaft 23 is engaged with the slide long hole 22 of the handle lock plate 11, and the handle lock plate 11 is supported in a freely rotatable manner in a direction along an in-plane direction of the other first frame 10*b* via the first rotation shaft 23. At one end and the other end of the handle lock plate 11, a notch 24 for lock and a grip piece 25 are formed, respectively.

The lock plate holding member 12 is connected to the support plate 18 at a position on the power supply-side connection portion 13 side via a second rotation shaft 26 and rotates about the second rotation shaft 26. In the lock plate holding member 12, a lock plate retaining hole 27 that has the same shape as that of the support plate locking hole 20 of the support plate 18 is formed. In addition, on the outer periphery on the second rotation shaft 26 side of the lock plate holding member 12, a notch engaging portion 28 that engages with the notch 24 for lock formed at one end of the handle lock plate 11 is formed.

Next, a process of attaching the handle lock device 2 having the above-described configuration at a regular position on the circuit breaker 1 will be described.

Screwing the power supply-side attaching screw 14 of the power supply-side connection portion 13 of the handle lock device 2 into the female screw in the power supply-side engagement portion 9*a* of the circuit breaker 1 arranged on the inside of the switchboard and screwing the load-side attaching screw 16 of the load-side connection portion 15 into the female screw in the load-side engagement portion 9*b* of the circuit breaker 1 enable the handle lock device 2 to be attached at the regular position on the circuit breaker 1 without removing the circuit breaker 1 from the inside of the switchboard.

Next, a process of locking the handle lock device 2 attached to the circuit breaker 1 with the padlock 3 and thereby locking the knob portion $\mathbf{8}_{OFF}$ of the handle 8 to the OFF position will be described with reference to FIGS. 3 to 7.

Figure 4:
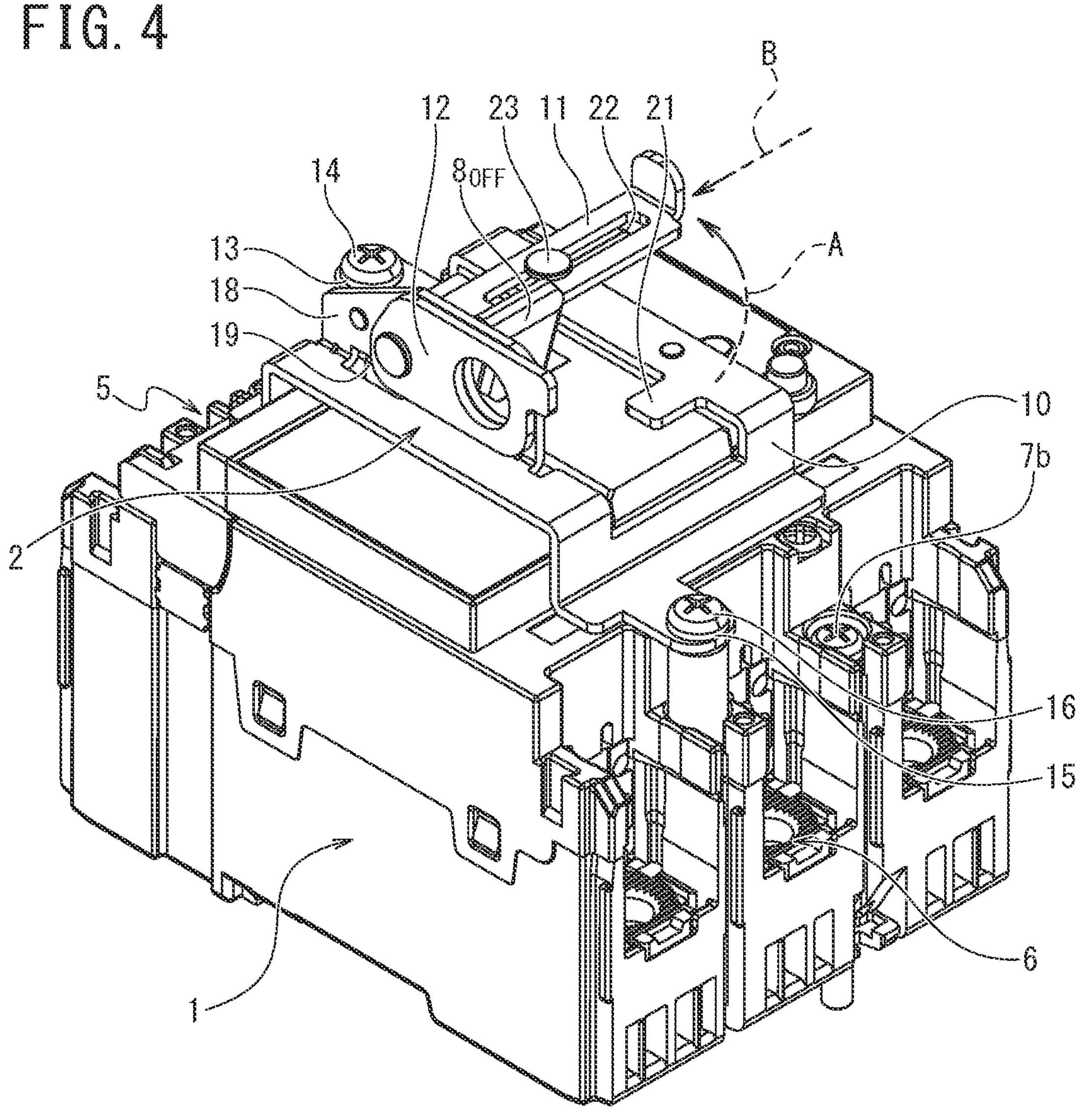
FIG. 4 is a diagram illustrative of a state in which a handle lock plate of the handle lock device is arranged in such a way as to cross the knob portion of a handle projecting from a cover.

First, as illustrated in FIG. 4, the handle lock plate 11 of the handle lock device 2 is rotated substantially 90° about the first rotation shaft 23 (an A operation illustrated by a dashed line in FIG. 4), and the one end side of the handle lock plate 11 is pointed to the support plate 18 side. Subsequently, while the first rotation shaft 23 is slid in the slide long hole 22, the handle lock plate 11 is moved to the support plate 18 side (a B operation illustrated by another dashed line in FIG. 4) in such a way that the one end side of the handle lock plate 11 is inserted into the slit 19 of the support plate 18. Through this processing, the handle lock plate 11 is arranged crossing the opening portion 4*b*1 of the cover 4*b*.

Figure 5:
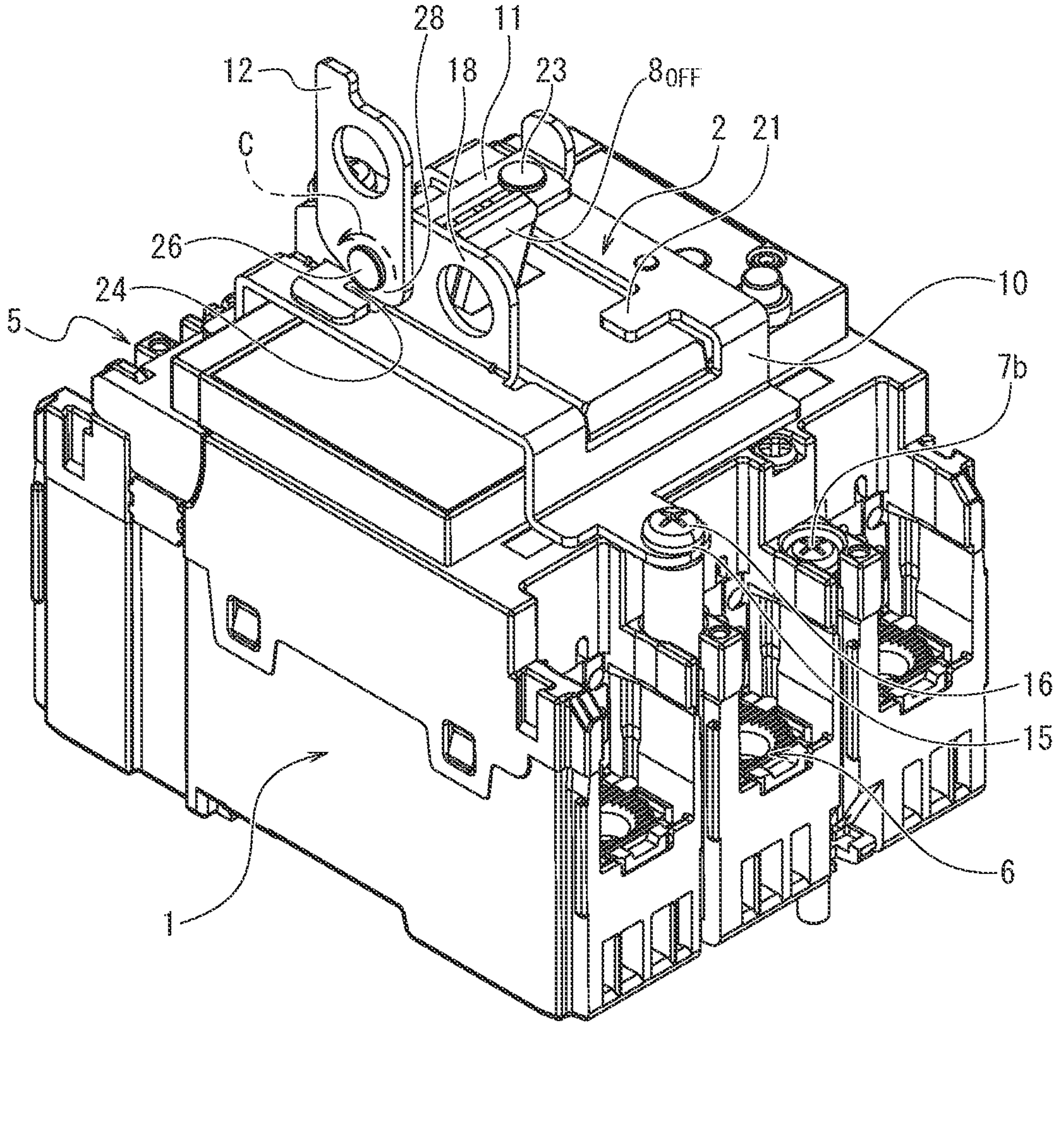
FIG. 5 is a diagram illustrative of a state in which a lock plate holding member is rotated lest the lock plate holding member engage with the handle lock plate of the handle lock device.

Subsequently, as illustrated in FIG. 5, before the notch 24 for lock of the handle lock plate 11 passes the slit 19 of the support plate 18, the lock plate holding member 12 is rotated about the second rotation shaft 26 (a C operation illustrated by a dashed line in FIG. 5) and the notch engaging portion 28 of the lock plate holding member 12 is thereby caused to move away from the notch 24 for lock.

Figure 6:
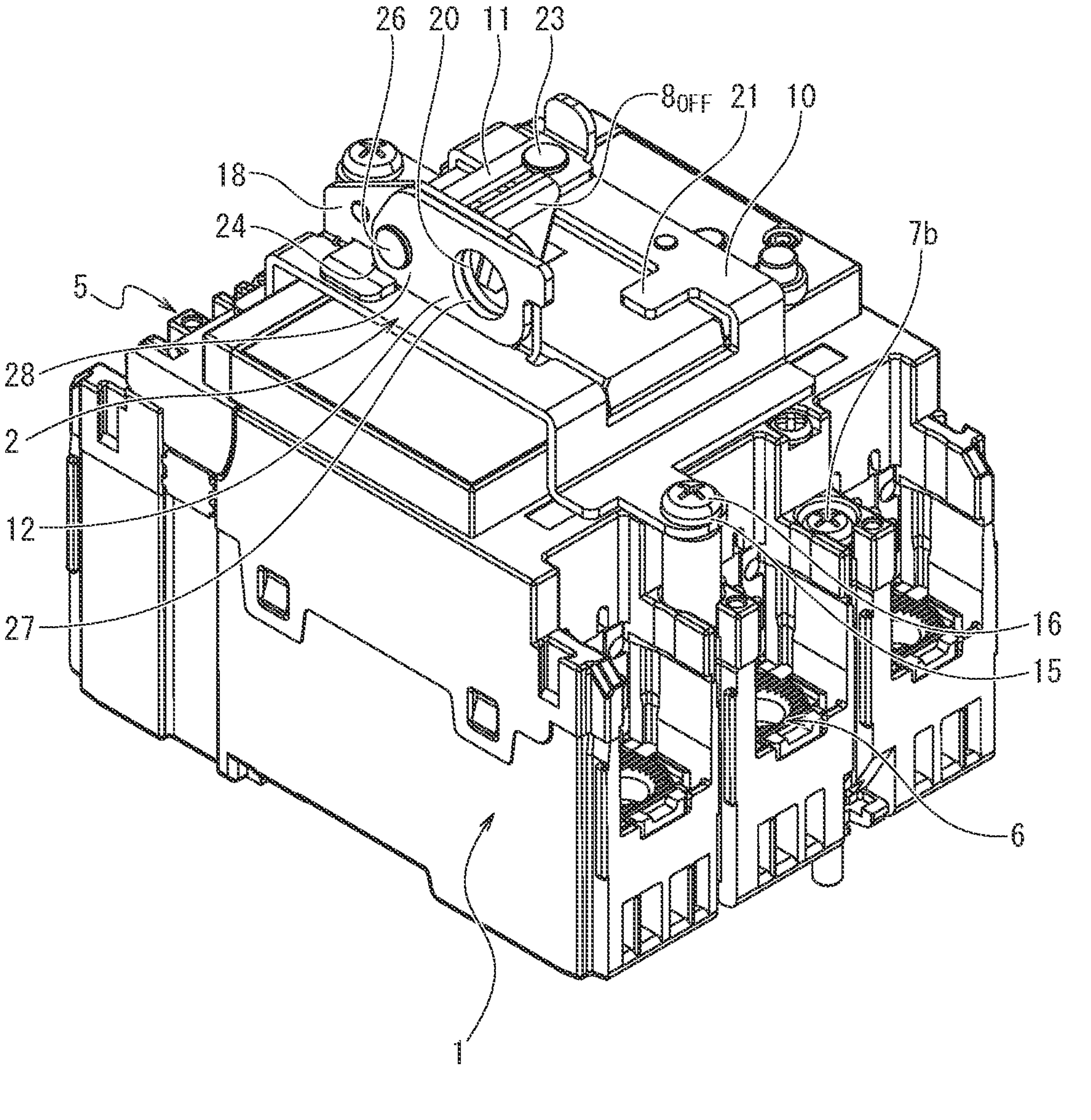
FIG. 6 is a diagram illustrative of a state in which by engaging the lock plate holding member of the handle lock device with the handle lock plate, movement of the handle lock plate is restricted.

Subsequently, as illustrated in FIG. 6, after the notch 24 for lock of the handle lock plate 11 passed the slit 19 of the support plate 18, the lock plate holding member 12 is returned to an original position and the lock plate retaining hole 27 of the lock plate holding member 12 is aligned with the support plate locking hole 20 of the support plate 18. On this occasion, the notch engaging portion 28 of the lock plate holding member 12 enters the notch 24 for lock of the handle lock plate 11.

Subsequently, as illustrated in FIG. 3, the shackle 3*a* of the padlock 3 is inserted into the support plate locking hole 20 and the lock plate retaining hole 27 aligned with each other, and the padlock 3 is locked. In this processing, although the lock plate holding member 12 rotates about the second rotation shaft 26 since outer diameter of the shackle 3*a* of the padlock 3 is considerably smaller than inner diameter of the support plate locking hole 20 and the lock plate retaining hole 27, an engaged state of the notch engaging portion 28 with the notch 24 for lock of the handle lock plate 11 is maintained.

Figure 7:
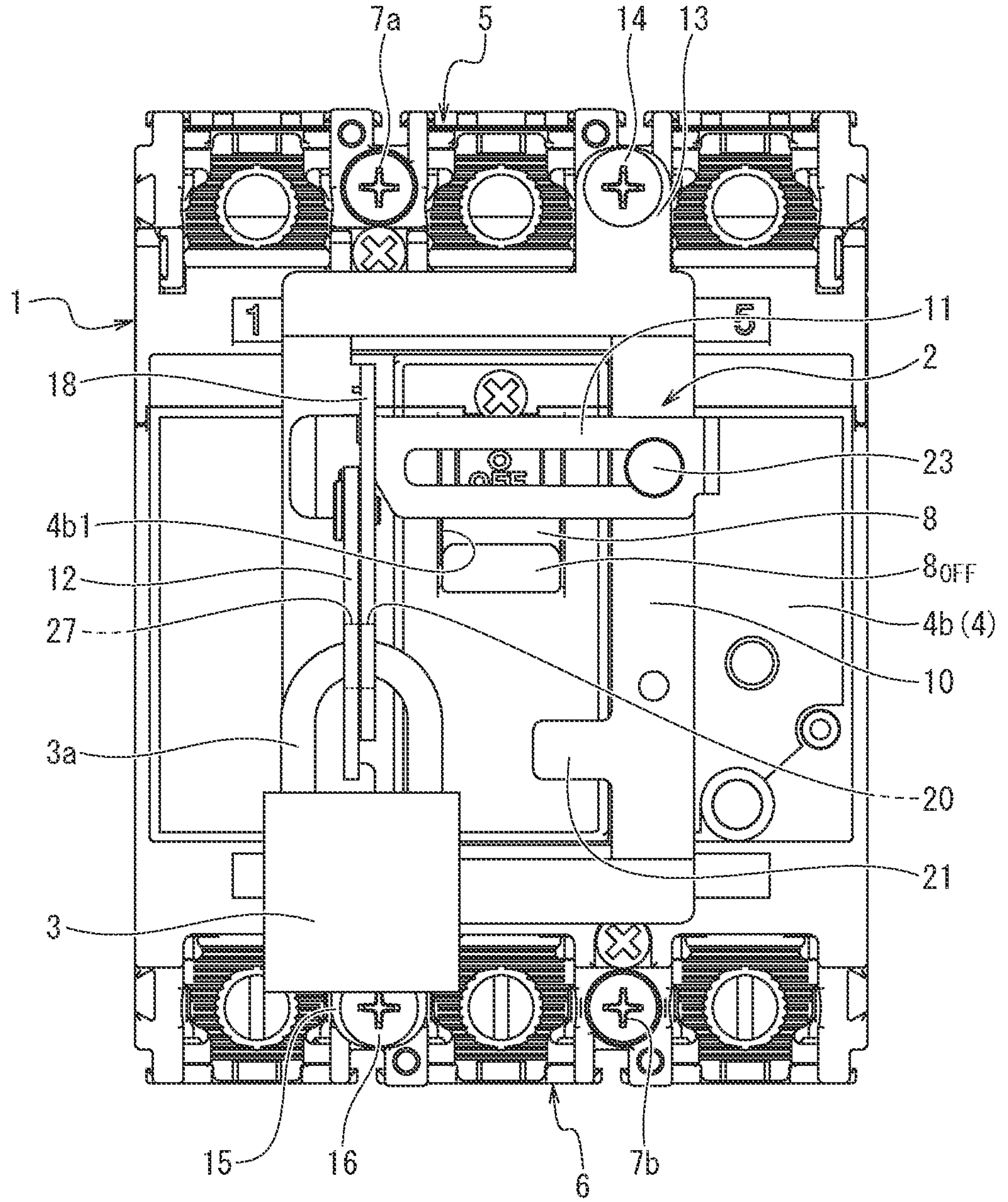
FIG. 7 is a plan view illustrative of a state in which by being locked with the padlock, the knob portion is locked to the OFF position.

Therefore, the engaged state between the notch 24 for lock and the notch engaging portion 28 being maintained causes movement of the handle lock plate 11 crossing the opening portion 4*b*1 of the cover 4*b* to be restrained, as illustrated in FIG. 7, and the handle lock plate 11 restricts the knob portion $\mathbf{8}_{OFF}$ of the handle 8 from moving upward in FIG. 7 (moving to an ON position of the handle 8). Because of this configuration, the handle lock device 2 of the present embodiment is capable of locking the knob portion $\mathbf{8}_{OFF}$ of the handle 8 to the OFF position.

In addition, the power supply-side attaching screw 14 and the load-side attaching screw 16 of the handle lock device 2 of the present embodiment are screwed into the power supply-side engagement portion 9*a* and the load-side engagement portion 9*b* that are dedicated only for use when the handle lock device 2 is attached, and the handle lock device 2 can be easily attached to the circuit breaker 1 without removing the circuit breaker 1 from the inside of the switchboard.

Figure 8:
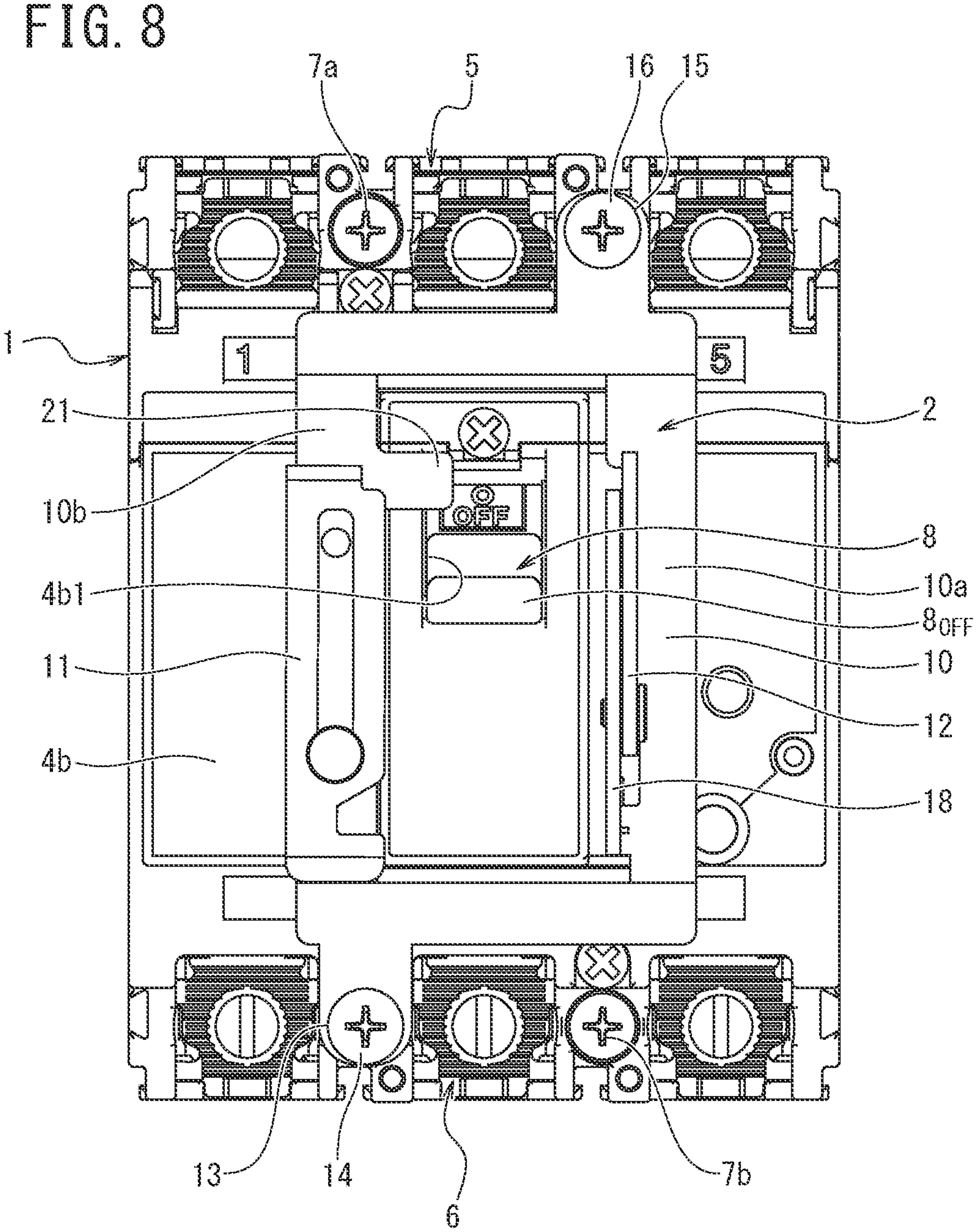
FIG. 8 is a diagram illustrative of a state in which the handle lock device according to the present disclosure is attached at an incorrect position on the circuit breaker and the knob portion of the handle is locked to the OFF position by a handle locking protrusion for incorrect attachment disposed on the handle lock device.

FIG. 8 illustrates a state in which the handle lock device 2 of the present embodiment is incorrectly attached to the circuit breaker 1. That is, the handle lock device 2 is incorrectly attached by engaging the load-side attaching screw 16 of the load-side connection portion 15 with the power supply-side engagement portion 9*a* of the circuit breaker 1 (see FIG. 1) and the power supply-side attaching screw 14 of the power supply-side connection portion 13 with the load-side engagement portion 9*b* of the circuit breaker 1 (see FIG. 1).

When the handle lock device 2 is incorrectly attached to the circuit breaker 1 as described above, the handle locking protrusion 21 that protrudes from the other first frame 10*b* of the lock base 10 is arranged at a position at which the handle locking protrusion 21 crosses the opening portion 4*b*1 of the cover 4*b* and the handle locking protrusion 21 restricts the knob portion $\mathbf{8}_{OFF}$ of the handle 8 from moving upward in FIG. 8 (to the ON position of the handle 8).

Therefore, even when the handle lock device 2 of the present embodiment is incorrectly attached to the circuit breaker 1, the handle locking protrusion 21 is capable of securely locking the knob portion $\mathbf{8}_{OFF}$ of the handle 8 to the OFF position.

REFERENCE SIGNS LIST

1 Circuit breaker
2 Handle lock device
3 Padlock
3*a* Shackle
4 Main-body case (case)
4*a* Base (divided body)
4*b*1 Opening portion
4*b* Cover (divided body)
5 Power supply-side terminal portion
6 Load-side terminal portion
7*a*, 7*b* Fixing screw
8 Handle
$\mathbf{8}_{OFF}$ Knob portion
9*a* Power supply-side engagement portion (handle lock screw engagement portion)
9*b* Load-side engagement portion (handle lock screw engagement portion)
10 Lock base
11 Handle lock plate
12 Lock plate holding member
10*a*, 10*b* First frame
10*c*, 10*d* Second frame
10*e* Opening portion
13 Power supply-side connection portion
14 Power supply-side attaching screw (attaching screw)
15 Load-side connection portion
16 Load-side attaching screw (attaching screw)
17 Spacer
18 Support plate
19 Slit
20 Support plate locking hole
21 Handle locking protrusion (handle locking portion)

22 Slide long hole
23 First rotation shaft
24 Notch for lock
25 Grip piece
26 Second rotation shaft
27 Lock plate retaining hole
28 Notch engaging portion
30 Attachment screw

The invention claimed is:

1. A handle lock device of a circuit breaker, the handle lock device locking a knob portion of a rocker-type open-close operation handle projecting from an upper portion of a case of the circuit breaker to an OFF position, wherein the circuit breaker has, at positions different from a position of an attachment screw for integrating the case including a plurality of divided bodies, at least two handle lock screw engagement portions to which the handle lock device is attached are formed on the case, the at least two handle lock screw engagement portions include a first handle lock screw engagement portion and a second handle lock screw engagement portion, the handle lock device comprising:

at least two attaching screws including a first attaching screw and a second attaching screw, the first and second attaching screws engaging with the first and second handle lock screw engagement portions of the circuit breaker and attaching the handle lock device at a position on the circuit breaker;

a first handle locking portion restricting the knob portion from moving to an ON position when the first attaching screw is attached to the first handle lock screw engagement portion;

a second handle locking portion restricting the knob portion from moving to the ON position when the second attaching screw is attached to the first handle lock screw engagement portion;

a lock base including the attaching screws and the second handle locking portion and attached on an upper portion of the case, wherein the first handle locking portion including a handle lock plate connected to the lock base in a freely rotatable manner and configured to move to a position at which the handle lock plate restricts the knob portion from moving to the ON position regardless of whether the attaching screws are correctly attached to the handle lock screw engagement portions; and a lock plate holding member connected to the lock base in a freely rotatable manner and configured to, by being locked with a padlock, restrain movement of the handle lock plate restricting the knob portion from moving to the ON position.

2. The handle lock device of the circuit breaker according to claim 1, wherein the lock base includes a pair of first frames extending in parallel with each other and a pair of second frames connecting the pair of first frames to each other, and the second handle locking portion is a handle locking protrusion that protrudes from one of the first frames toward an opening portion of the lock base.

* * * * *